OR 3,547,510

X 3040W X 3050Y
X 3036T X 3056E (8)

Dec. 15, 1970 D. J. DE BITETTO 3,547,510

HOLOGRAPHIC IMAGE SYSTEM AND METHOD EMPLOYING NARROW STRIP HOLOGRAMS

Filed Jan. 26, 1968 4 Sheets-Sheet 1

INVENTOR.
DOMINICK J. DeBITETTO

BY Frank R. Trifari

AGENT

INVENTOR.
DOMINICK J. DeBITETTO
BY
Frank R. Trifari
AGENT

Dec. 15, 1970 D. J. DE BITETTO 3,547,510

HOLOGRAPHIC IMAGE SYSTEM AND METHOD EMPLOYING NARROW STRIP HOLOGRAMS

Filed Jan. 26, 1968 4 Sheets-Sheet 3

INVENTOR.
DOMINICK J. DeBITETTO

BY [signature]

AGENT

INVENTOR.
DOMINICK J. DeBITETTO
BY
AGENT

United States Patent Office 3,547,510

Patented Dec. 15, 1970

3,547,510

HOLOGRAPHIC IMAGE SYSTEM AND METHOD EMPLOYING NARROW STRIP HOLOGRAMS

Dominick John De Bitetto, Briarcliff Manor, N.Y., assignor, by mesne assignments, to U.S. Philips Corporation, New York, N.Y., a corporation of Delaware Filed Jan. 26, 1968, Ser. No. 700,948

Int. Cl. G02b 27/22

U.S. Cl. 350—3.5 16 Claims

ABSTRACT OF THE DISCLOSURE

In a holographic image system, only information relating to a single narrow strip of a hologram is employed. The image is constructed by producing a composite of identical vertically aligned strips, or by providing a single strip with vertical movement. The resultant reconstructed image has for sufficiently thin strips horizontal three-dimensional characteristics and parallax, but subtantially no vertical three-dimensional characteristics and parallax. When a plurality of strips are mounted for sequential movement past the field of view of an observer, image movement can be observed without blurring and without the necessity of a stepping mechanism. Alternatively, a single hologram strip may be employed in the projection of a two-dimensional image.

Figure 1:
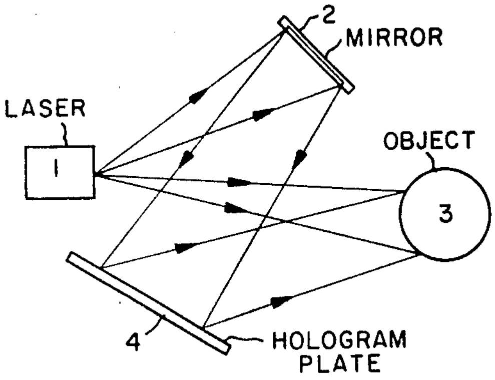

This invention relates generally to the field of three-dimensional images of the holographic type, and more in particular to a modified holographic image system in which certain redundant image information is eliminated, thereby facilitating transmission of image signals, as well as providing advantages in the reconstruction of images.

The extent of image information in a three-dimensional hologram is quite large as compared with a conventional two-dimensional image, and it has been suggested that a successful system for transmitting signals corresponding to a holographic image would require a system having a bandwidth four orders of magnitude larger than that of a two-dimensional image transmission system. This requirement is beyond the capability of conventional input and output systems. Although the bandwidth of signals can be reduced, for example, by reducing the rate of transmission of image information, the time necessary for such transmission reduces the usefulness of such an expedient.

According to the present invention, vertical parallax and vertical three-dimensional characteristics are sacrificed in order to reduce the space spatial-bandwidth product of a holographic image. In conventional viewing situations the three-dimensional aspects of an image result only from the horizontal displacement of the eyes of the observer, and hence information in the image related to vertical three-dimensional aspects is unnecessary. By eliminating or substantially eliminating such unnecessary information, the image information that must be transmitted in order to reproduce a hologram may be substantially reduced, for example, by at least two orders of magnitude.

It has now been found that this result can be successfuly achieved by employing strip holograms. In other words, all of the image information necessary to retain horizontal three-dimensional image aspects and parallax and a complete vertical field of view without serious image degradation is present in each narrow horizontal strip of a conventional hologram. Such a narrow strip can be formed, for example, by severing it from a larger conventional hologram, or by exposing only a narrow strip of the hologram plate. The image can be reconstructed from the strip hologram by several techniques. For example, a composite hologram can be made by assembling a plurality of identical strip holograms in substantial vertical alignment, or a singel strip may be vertically moved (e.g. at a rate beyond the visual perception of the eye). The resultant reconstructed image retains the horizontal three-dimensional characteristics and parallax, but the vertical three-dimensional characteristics and parallax are substantially lost although a complete vertical field of view is reconstructed. With this technique, since it is only necessary to transmit image information relating to a single thin strip of the conventional hologram, the bandwidth requirements of the transmission system are greatly reduced. While the invention is specifically described with reference to a transmission system, it will be apparent that the method of fabricating holograms and reconstructing images by this technique have advantages even when not employed in a transmission system. For example, the formation of a strip hologram requires less laser power to expose the strip to record the necessary image information, and when an image is reconstructed by employing a single moving strip, the "speckle-effect" is eliminated. In addition, by mounting a plurality of strips on a continuously moving film transport, image motion may be observed without the necessity for employing shutter mechanisms and film stepping devices. The hologram strips may also be employed in the projection of two dimensional images.

Figure 2:
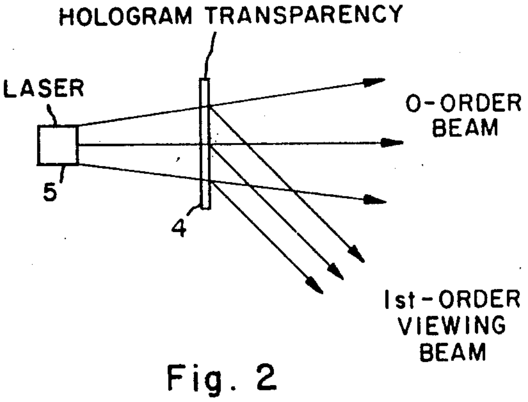
Figure 3:
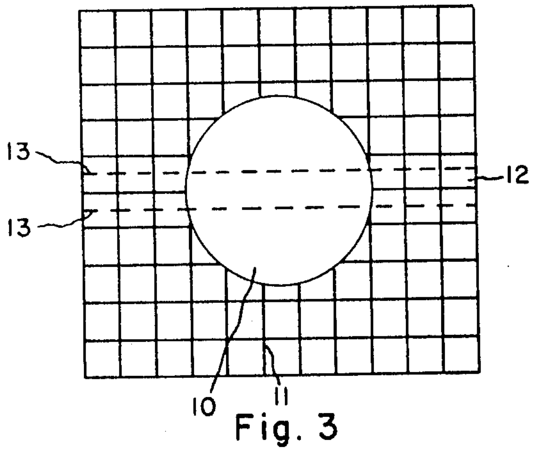
Figure 4:
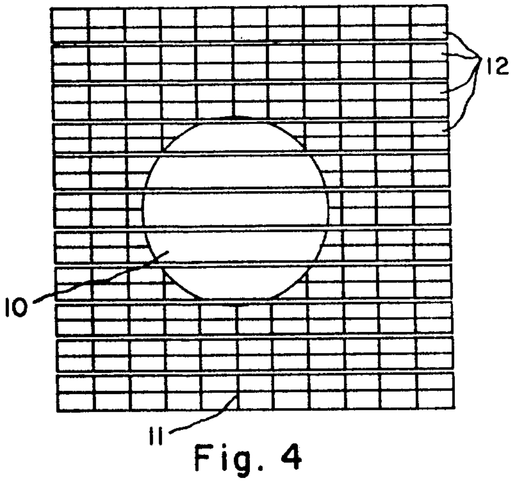
Figure 5:
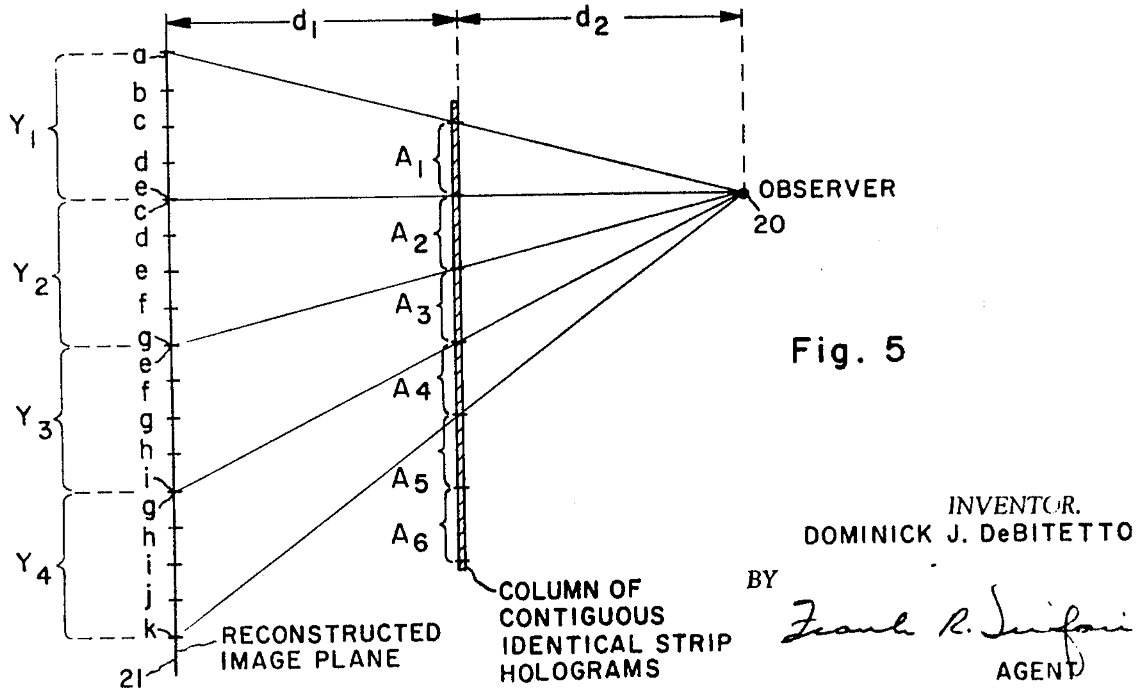
Figure 6:
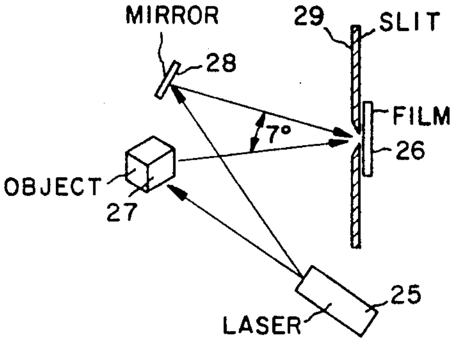
Figure 7:
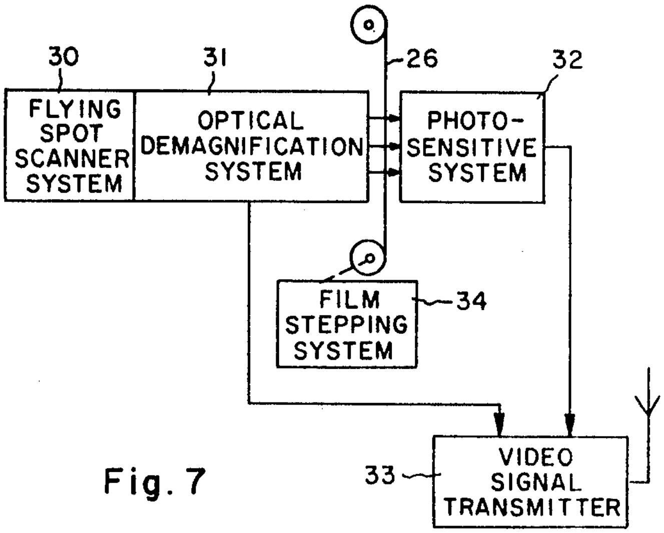
Figure 8:
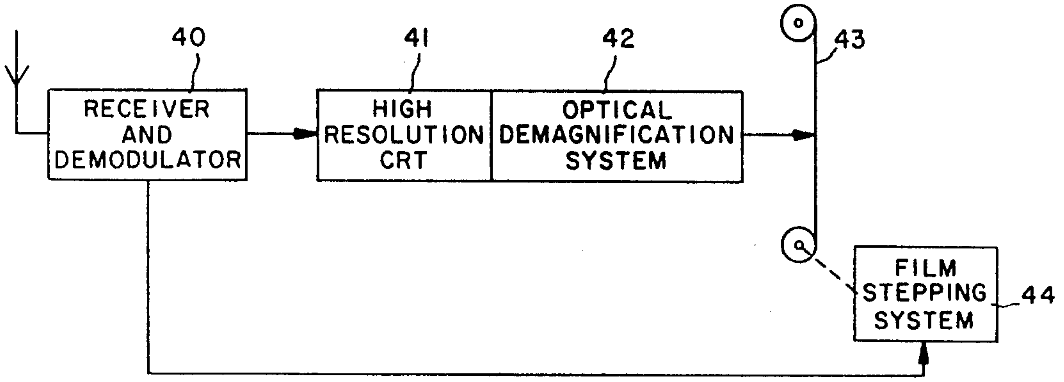
Figure 9:
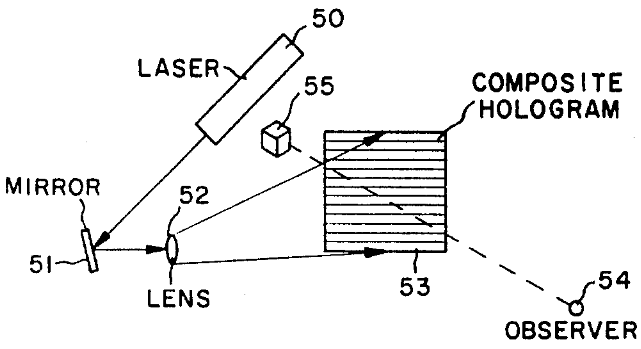
Figure 10:
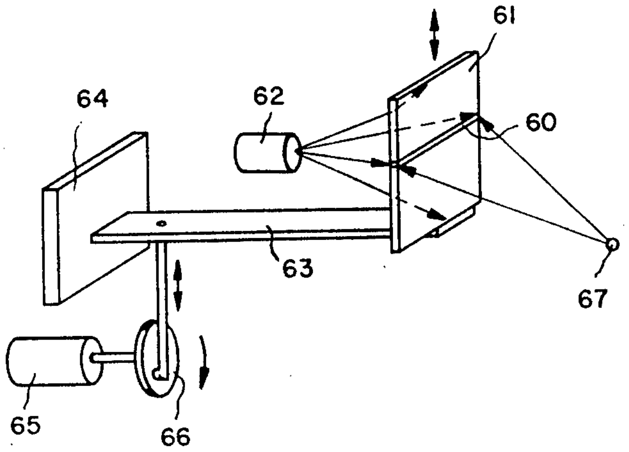
Figure 11:
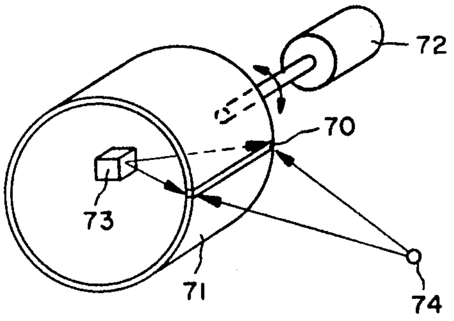
Figure 12:
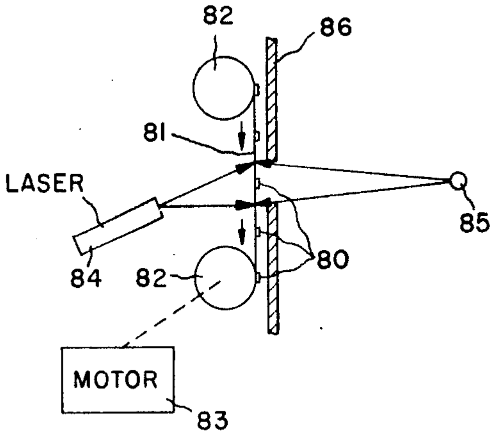
Figure 13:
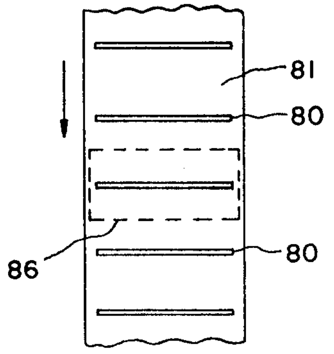
Figure 14:
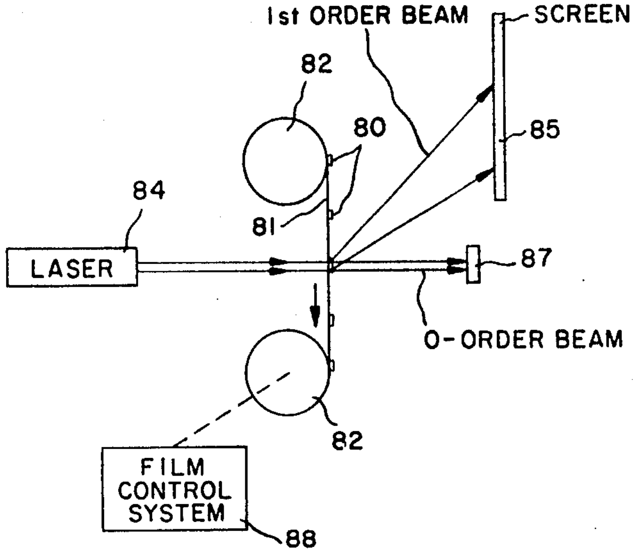

While the specification concludes with claims particularly pointing out and distinctly claiming the subject matter which I regard as my invention, it is believed that the invention will be better understood from the following description taken in connection with the accompanying drawings in which:

FIG. 1 illustrates diagrammatically a conventional technique for making a hologram, FIG. 2 illustrates diagrammatically a conventional technique for viewing a hologram, FIG. 3 illustrates an image viewed on a conventional hologram, FIG. 4 illustrates the same image viewed on a hologram fabricated according to my invention, FIG. 5 is a line drawing of a geometrical analysis of the hologram of FIG. 4, FIG. 6 illustrates diagrammatically a system for fabricating a strip hologram, FIG. 7 is a block diagram of a system for converting the image of a strip hologram to signals that may be transmitted, FIG. 8 is a block diagram of a system for receiving signals from the transmitter of FIG. 7 and reconverting them to a strip hologram, FIG. 9 illustrates one embodiment for viewing a composite hologram according to the invention, FIG. 10 illustrates one embodiment for viewing a strip hologram according to the invention, FIG. 11 illustrates another embodiment for viewing a strip hologram according to the invention, FIG. 12 illustrates the use of strip holograms in viewing image motion, FIG. 13 illustrates the mounting of strip holograms on a film transport for use in the system of FIG. 12, and FIG. 14 illustrates the use of strip holograms in the projection of two dimensional images, or single planes of three-dimensional images.

FIG. 1 illustrates generally the two beam technique for making a hologram. A source 1 of coherent radiation (e.g. a pulsed or continuous laser) is positioned to direct radiation to a mirror 2 and an object 3, and a photographic plate 4 is positioned to receive reflected radiation from the mirror 2 and the object 3. As is well known, the image recorded on the plate 4 is in the form of an interference pattern resulting from the differing phase relationships of the two reflected beams at different points on the plate. If the hologram recorded on plate 4 is in the form of a transparency, a three dimensional image can be reconstructed as shown in FIG. 2 by directing visible coherent radiation from source 5, which may also be a pulsed or continuous laser, and viewing the virtual image in the direction of the first order diffracted light from the hologram. The techniques for making holograms and reconstructing the image as shown in FIGS. 1 and 2 are illustrative only, and are not intended to limit the present invention.

It has been stated that each portion of the recorded hologram contains recorded information about each portion of the image. This does not mean, of course, that when viewing a portion of the hologram from a given direction, that the entire image will be seen. For example, if the object is in the form of a ball 10 in front of a grid 11, the entire reconstructed image viewed from one direction will appear as shown in FIG. 3, but if all but the strip 12 of the image (between the dashed horizontal lines 13—13) are masked, the image seen in the strip between these lines will not change unless the viewing angle of the observer changes. Thus, depending upon the viewing angle, the observer can see all portions of the image, but the relative height of the viewed portion with respect to the object will not substantially vary (excluding a slight vertical distension).

Assume, now, that the horizontal strip 12 the hologram 4 is cut out of the hologram and reproduced many times, and that the identical reproduced strips are assembled in substantial vertical alignment, as shown in FIG. 4 (wherein 11 identical strips are shown assembled in alignment). It has been found that, with such an arrangement of identical strips, the resultant composite hologram retains the parallax and panoramic three dimensional view in the horizontal direction, but that parallax and three dimensional characteristics in the vertical direction are substantially lost. In other words, when the composite hologram of FIG. 4 is viewed with both eyes of the observer in a horizontal plane, the three dimensional aspects of the image is the same as in the hologram of FIG. 3, and movement of the observer in a horizontal direction will show the same relative displacement of the ball and grid as in the hologram of FIG. 3. When the line of sight of the observer is moved in a vertical direction, however, the apparent vertical displacement between the ball and grid is substantially decreased as compared with the hologram of FIG. 3, and practically not observable when the number of strips is large and the height of the strips is small. Similarly, vertical parallax is substantially unobservable when the two eyes of the observer are aligned in a vertical plane.

An analysis of the system of FIG. 4 is shown in FIG. 5, wherein a plurality of contiguous identical hologram strips $A_1$–$A_6$ is shown in cross section between an observer at point 20 and a reconstructed image plane 21. The distance between the plane of the composite hologram and the image plane is denoted $d_1$, and the distance between the hologram plane and the point 20 is denoted $d_2$. In this analysis it is assumed that a coherent reconstructing wave is employed in order to reconstruct the image by conventional techniques.

With respect to an observer at fixed point 20, only a portion $Y_1$ of the reconstructed image is formed due to the strip $A_1$. For example, arbitrarily denoting equally vertically spaced apart points of total image as *a*, *b*, *c* . . . etc., the portions of the reconstructed image formed due to strip $A_1$ include only the points between *a* and *e*. Similarly, only portions $Y_2$, $Y_3$ and $Y_4$ of the reconstructed image are formed due to strips $A_2$, $A_3$ and $A_4$ respectively. When the strip holograms are contiguous, i.e. in actual contacting relationship, as shown in FIG. 5, the top and bottom edges of each strip repeats some of the image information of the adjacent strips. Thus, instead of reconstructing entirely different points of the total image than does strip $A_1$, strip $A_2$ reconstructs points *c*, *d*, *e*, *f* and *g*, while strip $A_3$ reconstructs points *e*, *f*, *g*, *h*, *i* and strip $A_4$ reconstructs points *g*, *h*, *i*, *j* and *k*. Thus, each strip of the hologram reconstructs some of the image information from the next higher strip, and some of the information from the next lower strip. When $d_1=d_2$, each strip repeats half of the next higher strip and half of the next lower strip. It can be shown that, regardless of the relative values of $d_1$ and $d_2$, the extent of image repetition from each strip is equal to the vertical size, i.e. height, of each strip. In other words, all of the image information of each strip is repeated in the adjacent strips when the strips are contiguous. The imaging imperfection apparent due to this image repeat effect, however, has been found to be dependent upon the relative strip height. In one example, when the composite hologram consisted of about 20 identical strips 5 mm. by 100 mm., the repeat effect was barely noticeable, and when the composite hologram consisted of about 100 identical strips 1 mm. by 100 mm., the effect could not be visually detected. The image repeat effect can also be reduced or eliminated by vertically spacing the strips, for example, by eliminating alternate strips. A more general analysis of the arrangement shows that the image repeat effect can be eliminated completely when the height A of each strip is equal to a fraction of the strip vertical spatial period equal to $$\frac{d_1}{d_1+d_2}$$

This results in periodic empty horizontal bars across the reconstructed image, but when the strip height is small (e.g. employing strips that are 1 mm. by 100 mm.), it has been found that the empty horizontal bars are not visually observable. In reconstructing an image employing strips assembled as shown in FIGS. 4 and 5, it is preferred that the image be reconstructed with a coherent beam having a slightly cylindrical wavefront in order to correct vertical distention of the image field, although such correction is not absolutely necessary.

From the above discussion it is apparent that a satisfactory three dimensional image can be reconstructed from the information present in only one narrow strip of the hologram, and that this image will have no substantial image degradation as compared with that produced by a conventional hologram. While the image does not have vertical parallax and vertical three-dimensional characteristics, the appearance of depth of an image to an observer normally rises only from horizontal three-dimensional characteristics anyway, since the eyes of the observer are usually in a horizontal plane. By sacrificing vertical three-dimensional effects and vertical parallax, the present invention provides a system that substantially reduces the space spatial bandwidth product of the hologram, and thus greatly facilitates the transmission of image information of the hologram.

Since all of the strips in the composite hologram according to the present invention are identical, transmission of information to form a complete hologram requires only the transmission of image information of a single strip. A great reduction in the bandwidth and/or signal transmission rate is thereby achieved. For example, in the above example wherein the composite hologram consisted of about 100 identical strips, a bandwidth reduction factor of 100 is obtained in the transmission of image signals. It is pointed out, however, that there is a limit to the minimum height of hologram strips that can be employed without introducing diffraction effects. Thus, in one example, slight diffraction effects were noted when the strip size was 0.2 mm. by 100 mm., arranged contiguously.

Suitable input and output equipment for the transmission of holographic images according to my invention may take many forms, and several examples will now be given in order that my invention be more clearly understood.

It is to be understood, however, that the broader concepts of my invention are not intended to be limited to the use of such apparatus.

A strip hologram for transmission may be obtained by merely severing a strip of the desired dimensions from a hologram recorded by conventional techniques, or the strip may be formed by recording only the desired information as shown in the system of FIG. 6. In this arrangement, radiation from a laser 25 is reflected to a suitable recording film 26 from an object 27 and a mirror 28 only through an optical slit 29. The laser radiation may be pulsed or coninuous. The angle between the radiation reflected from the object 27 and mirror 28 is preferably equal to or less than about seven degrees in order that the fringe lines have a wide enough spacing that can be recorded on the moderate resolution film. The film 26 is preferably capable of a resolution of at least 200 lines per millimeter, and may for example be Kodak S0243 film, a photochromic film, a dry silver film, or a thermoplastic sheet film. It is, of course, preferable that the thickness of the recording medium on the film be as thin as possible (e.g. equal to or less than about 4 microns). The exposed film is processed by conventional techniques according to the instructions of the manufacturer.

In order to convert the image on the hologram strip into signals that can be transmitted, the strip may be scanned by any of a number of techniques. If the fringe lines on the recorder image are about 5 microns (i.e., recorded at a resolution of about 200 lines per millimeter), and by the sampling theorem the film must be scanned with a resolution of about 400 lines per millimeter, so that a beam that scans the film must have a resolution of about 2.5 microns.

One technique for scanning the hologram strip to produce the image signals is illustrated in FIG. 7. In this system, a flying spot scanning system 30 is provided to produce a scanning beam, and in order to produce the necessary scanning resolution the scanning raster of the flying spot scanner is optically reduced in an optical demagnification system 31. Hologram strip 26 is positioned to be scanned by the reduced diameter beam, and radiation passes through the film and is received by a conventional photosensitive system 32 in order to produce video signals. The video signals and synchronization signals from the scanning system 30 are applied to a conventional transmitter 33 for transmission. Since the hologram strip 26 is very elongated, it is preferable to scan only a segment of the strip during each field of the spot scanner. In this case, suitable film stepping means 34 are provided in order to permit the production of video signals corresponding to the whole strip, for example, when video signals are to be produced from a strip 1 mm. by 100 mm. The raster of the scanner may be reduced to scan an area of 1 mm. square, and the film strip is then stepped 100 times in order to produce signals from the whole strip. As an example, if the 1 mm. square segments are scanned with a 400 line raster at a frame rate of 1/60 second, the video signal produced has a bandwidth of about 10 mHz., and transmission of the total strip of 100 segments takes about 1.6 sec. Since the total image information for the composite image reproduction at the receiver is contained in one strip, no additional time is required for transmission of the image.

It is to be noted that the formation of original hologram strips is not absolutely necessary, since for example in the system of FIG. 7, film may be positioned so that only a single strip of a larger hologram is scanned. This may be of advantage to eliminate effect of diffraction due to the narrow slit on the final hologram strip, which may be narrower than the slit. It is also noted that instead of reducing the size of the scanning beam of the flying spot scanner, the hologram strip may be enlarged and recorded (for example by 10 × magnification), and the flying spot scanner then employed without demagnification to scan the enlarged strip. As an alternative, a laser source and light deflection system may be substituted for the flying spot scanning system, employing for example an acoustic light deflection for scanning the beam.

The transmitted signals may be received and processed in a system such as shown in FIG. 8, wherein the signals are received and demodulated in a receiving system 40 of conventional design having a sufficient bandwidth (e.g. 10 mHz. in the previous example). The video signals are applied to a high resolution cathode ray tube system 41, and the modulated display image of the cathode ray tube is optically demagnified in a suitable system 42 and projected on a high resolution film 43. The film is stepped, as in the transmitter, by means of a stepping motor system 44 synchronized by signals from the receiver, in order to completely reproduce the strip hologram (e.g. 1 mm. by 100 mm. and consisting of 100 horizontally contiguous 1 mm. square images). The resultant film strip, which may for example be Kodak SO243 or a dry film of high resolution (e.g. at least 200 lines per millimeter) is then developed to produce a strip hologram of same nature as the original strip hologram.

In order to view the hologram, a composite hologram may be formed by producing a plurality of identical copies of the received strip, and assembling the strips in vertical alignment in the manner shown in FIG. 4. The resultant composite hologram may be viewed as shown in FIG. 9, wherein a reconstructing wave derived from a laser 50 is reflected by a mirror 51 to a diverging lens 52, and thence is projected on the composite hologram 53. An observer located at a point 54 in the path of the first order diffracted rays will observe the virtual image 55, as in the case of a conventional hologram, with the exception as above noted that the vertical parallax and vertical three-dimensional aspect will be absent or substantially absent, depending upon the hologram strip height.

Reconstruction of the image according to the present invention is also possible, and with some advantages, by employing a single hologram strip which is provided with movement in the direction of the strip height. For example, as shown in FIG. 10, a single strip hologram 60 is mounted on a plate 61. The plate may be completely transparent, but is preferably opaque in all regions except behind the hologram strip. A laser 62 is positioned behind the plate 61 to direct radiation toward the hologram strip. A flexible bar 63 is provided with one end mounted on a fixed member 64. The bar is provided with a vertical oscillatory movement, for example by means of a motor 65 connected to a suitable rotary-to-reciprocatory converter such as a bell-crank mechanism 66. The plate 61 is affixed to the other end of the bar 63 in a plane substantially normal to the axis of the bar, so that the horizontal hologram strip 60 is provided with a vertical oscillatory movement. It is preferred that the frequency of the oscillatory movement is equal to or greater than about 20 Hz. An observer at point 67 in the direction of the first order diffracted wave will be able to see the entire virtual image, with horizontal parallax and three-dimensional aspects, but without vertical parallax and three-dimensional aspects. While the laser 62 may be fixed and illuminate the entire back side of the plate 61, a lower power laser will be required if the beam is shaped to illuminate only the hologram strip, and be moved in synchronism with the strip. The arrangement of FIG. 10 results in the further advantage that disturbing "speckle-effect" that normally occurs with a conventional hologram is substantially eliminated.

The vertical movement of the single strip hologram may also be achieved by other means, while retaining the advantages of the system of FIG. 10. For example, as shown in FIG. 11, a strip hologram 70 fabricated in the previously described manner is mounted on a drum 71. The strip 70 extends substantially parallel to the axis of the drum. The drum may be totally transparent, but it is preferred that it be opaque except in the region where the strip 70 is attached to it. A rotary movement is imparted to the drum by means of a motor 72 connected to the drum by any conventional technique. A laser 73 is mounted in the drum to direct visible radiation horizontally toward one side of the inside of the drum. An observer at a point 74 outside of the drum, in the direction of the first order diffracted wave, will see the entire virtual image as in the arrangement of FIG. 10. The laser may have a fixed mounting and illuminate a wide area of the inside of the drum, or it may be mounted to provide a narrow beam that illuminates only the strip 70 and moves in synchronism with the strip. The drum is preferably rotated at a rate so that the strip passes through the field of vision of the observer at a frequency of at least about 20 Hz. As in the arrangement of FIG. 11, the viewed image does not exhibit the "speckle-effect." The speed of rotary movement of the drum may of course be reduced by providing several equally spaced strip holograms on the surface of the drum.

The system of the present invention also facilitates the viewing of image motion in the reconstruction of holographic images. In the systems of FIGS. 10 and 11 it is to be noted that no attempt is made to provide a "step" time motion to the hologram strip. Thus, motor 72 can rotate at a continuous rate. The resultant image is not blurred as a result of the continuous strip vertical movement, however, since the hologram strip has substantially no vertical parallax and three-dimensional characteristics. In other words, with an observer at a fixed point, the relative positions of elements of the image in the vertical direction do not change with changes in vertical position of the strip hologram. When a hologram has sufficient height that vertical parallax is present, image blurring results from such continuous movement of the hologram.

A manner of viewing image motion using hologram strips is illustrated in FIG. 12. In this arrangement, the movable viewing member may be in the form of a plurality of hologram strips 80 mounted on a suitable film transport 81. The film transport is mounted on suitable reels 82 for continuous constant velocity movement in the direction parallel to the strip height by means of a motor 83. A laser 84 is provided on one side of the film transport to project a coherent beam of light as wide as the horizontal strip length toward the film transport, and an observer at point 85 on the other side of the film transport in the direction of the first order viewing beam will be able to view the vertically scanned virtual image. A viewing aperture 86 is provided to define the desired viewing area. When the film transport is moved with a sufficient speed, e.g., so that each hologram strip passes the viewing aperture in $\frac{1}{20}$ second or less, the resultant reconstructed image does not exhibit any flicker, even though the film transport has a continuous speed. If the sequential hologram strips on the film transport correspond to sequentially record positions of an image in motion, the motion will appear to be continuous in the reconstructed image, without blurring.

As shown in FIG. 13, the hologram strips 80 may be mounted on the surface of the film transport, and are preferably spaced apart sufficiently that only one strip is aligned with the viewing aperture at any given time. The film transport is preferably opaque at all regions except underneath the hologram strips. Alternatively, of course, the film transport and hologram strips may be in the form of a single film in which the hologram strips are integral with the transport, the film again being preferably opaque except in the regions where the hologram strips have been exposed and developed thereon. The laser 84 is illustrated as having a wide angle beam radiating the entire aperture, although as an alternative a narrow fan-shaped laser beam may be employed that has a synchronized movement with respect to the hologram strips in order that a lower power laser may be employed.

The system illustrated in FIG. 12, aside from readily permitting movement in the reconstructed image without need for stepping of the film transport, also overcomes the problem of the speckle-effect, and permits the use of hologram strips, which have the reduced space-spatial bandwidth. The system of FIG. 12 is also advantageous as a motion picture system, i.e., where the image information is not necessarily transmitted, especially in view of the fact that the film transport motion can be continuous and no shutter mechanism is required, and that the image is three-dimensional.

In a further modification of my invention, as shown in FIG. 14, the hologram strip may be employed in a system for projecting a reconstructed two dimensional image or a focussed plane of a reconstructed three-dimensional image. In this arrangement, as in the arrangement of FIG. 13, the hologram strips 80 are mounted on a suitable film transport 81, which is in turn mounted for vertical movement on reels 82. A laser 84 is provided on one side of the film transport for directing radiation toward the film transport. A screen 85 is positioned in the direction of a diffracted first order beam, and a stop 87 may be provided to absorb the zero-order and other first order beams that emanate from the hologram strips. The film transport and hologram strips may be fabricated in the same manner as in the system of FIGS. 12 and 13.

In the system of FIG. 14, the screen 85 is located at the position of the real image, and consequently a two-dimensional image, or a single plane of a three-dimensional image, will be in focus on the screen. The particular plane that is in focus depends, for example, upon the relative spacing of the screen and the plane of the hologram strips, as well as the geometry of the conditions under which the original hologram strip was exposed. The laser beam width and relative spacings of the hologram strips are preferably arranged so that only a single strip is irradiated at any given time. Thus, when a narrow beam (e.g., 5 mm. diameter or less) is employed, the strips may be quite close together (e.g. separated with gaps of about 5 mm.). In the arrangement of FIG. 14 it may be advantageous in order to make more efficient use of the laser radiation, if the hologram strips 80 each consist of a plurality of very narrow identical strips, with suitable spacing as discussed with reference to FIG. 5. Thus, for example, with a 5 mm. diameter beam, a hologram strip may be comprised of five identical 1 mm. strips. The arrangement of FIG. 14 also includes a film control system 88 for moving the film transport. This film control system may be a motor, as in the system of FIG. 12, for providing continuous movement to the strip. Alternatively, the film control system may include means for stopping and moving the strip, for example, by manual control, so that any desired image may be reconstructed. By also providing means for controlling the plane of the reconstructed image that is in focus, for example, by moving the plane of the screen 85, movement of any part of an image can be tracked in three dimensions. The image viewed on the screen 85 in this system at any given time is, of course, two dimensional.

It will be understood, of course, that while the forms of the invention herein shown and described constitute the preferred embodiments of my invention, it is not intended herein to illustrate all of the equivalent forms or ramifications thereof. Thus, for example, other scanning techniques may be employed for producing the signals and for reproducing the hologram strips. Further, while all of the embodiment described refer to the use of a laser beam for reconstructing the images, other techniques may be employed, such as white light viewing with simple dispension compensation, as explained in Applied Physics Letters, vol. 9, No. 12, pp. 417–418, December 1966. Similarly, I do not intend that my invention be limited to the arrangements disclosed above for the formation of the strip holograms. It will be obvious that modifications may be made without depending from the spirit and scope of the invention, and it is aimed in the appended claims to cover all such changes as fall within the true spirit and scope of the invention.

What I claim is:

1. A hologram assembly comprising a plurality of frames, each of said frames consisting of a plurality of substantially identical hologram strips each having a length substantially greater than its height, said hologram strips being positioned substantially parallel to each other in a common plane with their ends substantially aligned.

2. A hologram of claim 1 in which said strips are spaced apart by gaps no greater than the height of said strips.

3. A hologram film comprising an elongated film transport, a plurality of frames on said film, each of said frames consisting of a plurality of substantially identical parallel hologram strips, the lengths of said strips being substantially greater than their heights whereby the image information related to parallax in the lengthwise direction on said strips is substantially greater than the image information related to parallax in the height direction, said hologram strips being positioned with their height dimensions parallel to the length dimension of said film transport, said frames corresponding to sequentially recorded positions of an image.

4. A method for reducing the space spatial bandwidth product of a hologram comprising making a plurality of duplicate strip holograms of the same subject and having heights substantially less than their lengths, and assembling only said strip holograms parallel to each other and substantially aligned with respect to each other in a plane to form a composite hologram, whereby images reconstructed with said composite hologram having substantially no parallax in the direction of the heights of said strips.

5. A system for reconstructing images comprising a hologram strip having a length substantially greater than its height whereby said strip contains substantially greater image information related to parallax in the direction of its length than in the direction of its height, means for irradiating said strip with a continuously illuminating image reconstructing beam having substantially constant intensity, means for moving said strip in a direction parallel to its height, and means for viewing a reconstructed image from a first order diffraction beam emanating from said strip. whereby an image reconstructed from the image information on said strip has substantially no visible parallax in the direction of its height.

6. The system of claim 5 in which said means for moving said strip comprises means for continuously moving said strip in said direction with substantially constant speed through a given region.

7. The system of claim 5 in which said means for moving said strip comprises means for reciprocating said strip in a given region.

8. A system for reconstructing images comprising a plurality of frames, each of said frames consisting of a plurality of substantially identical hologram strips having lengths substantially greater than their heights, whereby said strips contain substantially greater image information related to parallax in the direction of their lengths than in the direction of their heights, means for sequentially moving said frames in a given direction parallel to their heights through a given region, means for projecting an image reconstructing beam having a substantially constant intensity on said strips at least as they pass through said given region, and means for viewing a reconstructed image from a first order diffraction beam emanating from said strip.

9. The system of claim 8 wherein each of said frames consists of a plurality of identical separate hologram strips extending parallel to each other, said image reconstructing beam has a dimension in the direction of the height of said first mentioned strip whereby substantially only one of said first mentioned strips is irradiated at any given time.

10. The system of claim 8 wherein said means for viewing comprises viewing aperture means whereby said reconstructed image is formed by substantially only one of said frames at a given time.

11. The system of claim 8 wherein said means for moving said plurality of frames comprises means for moving said frames at a substantially constant speed such that images reconstructed from said strips are viewed at a rate of at least 20 per second.

12. A holographic image reconstructing system comprising film transport means, means for continually moving said film transport means in a given direction at substantially constant speed through a given viewing region, said film transport means comprising a plurality of frames, each of said frames consisting of a hologram strip having its length substantially greater than its height, said strips being positioned in parallel relationship to each other with the height dimension of said strips extending parallel to the direction of motion of said film transport means, and a source of image reconstructing radiation having a substantially constant intensity directed to irradiate said strips as they pass through said region, said strips being spaced apart in the direction of said movement of said film transport means.

13. The image reconstructing system of claim 12 wherein said strips are sufficiently spaced apart that only one strip is present in said region at any given time, and said transport means is moved with a sufficient speed that at least about 20 strips pass through said region per second.

14. The image reconstructing system of claim 12 wherein sequential strips on said film transport means correspond to sequentially recorded positions of an image.

15. The image reconstructing system of claim 12 comprising a screen positioned on the path of a first order diffracted beam from said hologram strips, whereby a two dimensional reconstructed real image appears in focus on said screen.

16. A method for the transmission of holographic images comprising forming a hologram strip having a length substantially greater than its height, scanning said strip to produce image signals, transmitting and receiving said image signals, converting said signals to the form of a hologram strip, reconstructing an image from said last mentioned strip, and moving the image of said strip in a direction parallel to its height whereby said moving reconstructed image has substantially no parallax in the direction of the height of said last mentioned strip, but has substantial parallax in the direction of the length thereof.

References Cited

Paques et al., Optics Cineholography, pp. 1–4 (June 1965).

McCracken, A Preliminary Study of Holography, pp. 81–82 (January 1966).

Gabor et al., Journ. Opt. Soc. Am., vol. 56, No. 7, pp. 849–858 (July 1966).

Cindrich, Applied Optics, vol. 6, No. 9 (September 1967), pp. 1531–1534.

DAVID SCHONBERG, Primary Examiner

R. L. SHERMAN, Assistant Examiner

U.S. Cl. X.R.

352—66